(12) United States Patent
Farrell et al.

(10) Patent No.: US 11,318,725 B2
(45) Date of Patent: May 3, 2022

(54) ABSORBENT PAPER LAMINATE AND FOOD CONTAINER MADE THEREOF

(71) Applicant: P34E, LLC, St. Clair Shores, MI (US)

(72) Inventors: Bradley Farrell, Northridge, CA (US); Charles E. Marlin, St. Clair Shores, MI (US)

(73) Assignee: P34E, LLC, St. Clair Shores, MI (US)

( * ) Notice: Subject to any disclaimer, the term of this patent is extended or adjusted under 35 U.S.C. 154(b) by 0 days.

(21) Appl. No.: 16/838,839

(22) Filed: Apr. 2, 2020

(65) Prior Publication Data

US 2021/0308999 A1 Oct. 7, 2021

(51) Int. Cl.
*B32B 29/00* (2006.01)
*B32B 7/12* (2006.01)
*B32B 3/26* (2006.01)
*B32B 1/02* (2006.01)
(Continued)

(52) U.S. Cl.
CPC .............. *B32B 29/005* (2013.01); *B32B 1/02* (2013.01); *B32B 3/266* (2013.01); *B32B 7/12* (2013.01); *B65D 65/40* (2013.01); *B65D 81/264* (2013.01); *B32B 2307/726* (2013.01); *B32B 2307/7265* (2013.01); *B32B 2439/70* (2013.01)

(58) Field of Classification Search
CPC . B32B 29/005; B32B 15/14; B32B 2262/062; B32B 2262/12; B32B 2307/7163; B32B 2307/726; B32B 2307/7265; B32B 2439/70; B32B 2553/00; B32B 5/08; B32B 7/02; B32B 1/02; B32B 3/266; B32B 7/12; B65D 65/40; B65D 81/264
See application file for complete search history.

(56) References Cited

U.S. PATENT DOCUMENTS

| | | | |
|---|---|---|---|
| 4,892,535 | A | 1/1990 | Bjoernberg et al. |
| 5,830,548 | A | 11/1998 | Andersen et al. |
| 6,649,024 | B2 | 11/2003 | Oriaran et al. |

(Continued)

FOREIGN PATENT DOCUMENTS

WO 2013067153 A1 5/2013

OTHER PUBLICATIONS

International Search Report and Written Opinion for International Application No. PCT/US2021/25418, Completed by the International Patent Office, dated Jun. 29, 2021, 29 pages.

*Primary Examiner* — Yan Lan
(74) *Attorney, Agent, or Firm* — Brooks Kushman P.C.

(57) ABSTRACT

An absorbent paper laminate, having an absorbent paper layer, a nonabsorbent high-density paper layer and an adhesive applied in a layer between the absorbent and nonabsorbent layers forming a laminate. The laminate has a surface which is provided with an array of perforations formed by needle punctures or a series of slits sized to allow steam to pass therethrough while retaining grease and oil in the absorbent paper layer. The preferred adhesive layer is selectively in a cellular pattern. A paper board food container can be formed having an absorbent paper laminate body defining a cavity for receiving a food item and absorb grease and oil. Optionally an exterior surface of the container is sized to be held in the hands of a user having an exterior surface with a second absorbent layer that can act as a napkin absorbing grease and oil from the hands of the user.

19 Claims, 5 Drawing Sheets

(51) Int. Cl.
*B65D 65/40* (2006.01)
*B65D 81/26* (2006.01)

(56) References Cited

U.S. PATENT DOCUMENTS

| | | | |
|---|---|---|---|
| 9,296,519 | B2 | 3/2016 | Suzuki et al. |
| 2004/0023000 | A1* | 2/2004 | Young ................ B65D 81/3446 428/138 |
| 2005/0054999 | A1 | 3/2005 | Morman et al. |
| 2006/0122318 | A1* | 6/2006 | Jho ........................ D21H 19/20 524/501 |
| 2007/0039875 | A1 | 2/2007 | Solomon-Winnemore et al. |
| 2012/0325834 | A1 | 12/2012 | Farrell et al. |
| 2013/0015084 | A1 | 1/2013 | Farrell et al. |
| 2017/0233129 | A1* | 8/2017 | Volpis .................. B65D 5/4295 229/120 |
| 2017/0265502 | A1 | 9/2017 | Farrell et al. |
| 2017/0267433 | A1 | 9/2017 | Farrell et al. |
| 2017/0267434 | A1 | 9/2017 | Farrell et al. |
| 2017/0267435 | A1 | 9/2017 | Farrell et al. |
| 2017/0304535 | A1 | 10/2017 | Hirata et al. |
| 2017/0305634 | A1* | 10/2017 | Farrell .................... A01M 1/20 |
| 2017/0305635 | A1 | 10/2017 | Farrell et al. |
| 2017/0320305 | A1* | 11/2017 | McMillan ............... B32B 27/10 |
| 2018/0002097 | A1 | 1/2018 | Farrell et al. |

* cited by examiner

ABSORBENT PAPER LAMINATE AND FOOD CONTAINER MADE THEREOF

TECHNICAL FIELD

The present disclosure relates to composite materials that absorb and trap liquids. The composite materials may be used in food packaging.

BACKGROUND

Today many foods include fats, oils, grease, and/or sodium that may make food more appetizing but less healthy and messy. This type food is popular among many fast and convenient food providers. Health impacts associated with fats, oils, grease and/or sodium are well known. Not only is this food less healthy but it may contaminate various environmentally friendly waste processing streams such as recycling and composting. A significant amount of cardboard and paper is not recycled because of fat, oil and/or grease saturation, which makes the process difficult, or impractical. Likewise, a significant amount of compostable material is diverted from composting facilities to landfills because it is saturated or contaminated with fats, oils, and/or grease. Fats, oils, and/or grease may even complicate water treatment for clean water. Coated packaging materials have been used to package foods with excess fat, oil, and/or grease. For example, fluorinated coatings may be used. However, many of these coated materials also make recycling or composting impractical. Further, coated materials may introduce new materials that may be toxic or potentially toxic. Traditional packaging materials are also not suitable for many cooking or re-heating techniques. Often a food item will become soggy or undesirable upon re-heating. Accordingly, there remains a need for a packaging material that solves one or more of these problems or offers an alternative to traditional packaging materials.

SUMMARY

An absorbent paper laminate is provided having an absorbent paper layer, a nonabsorbent high-density paper layer and an adhesive applied in a layer between the absorbent and nonabsorbent layers forming a laminate. The laminate has a surface which is provided with an array of perforations formed by needle punctures or a series of slits sized to allow steam to pass therethrough while retaining grease and oil in the absorbent paper layer.

The preferred absorbent paper layer, a nonabsorbent high-density paper layer and an adhesive are all PFAS free. The laminate preferably meets the ASTM 6400 biodegradability standard.

The preferred adhesive layer is applied selectively in a cellular pattern. Preferably, the cellular pattern forms a plurality of interconnected hexagons or rectangles with an area of about 0.05 to 0.5 square inches.

A paper board food container can be formed having an absorbent paper laminate body defining a cavity with a first absorbent surface for receiving a food item and to absorb excess grease and oil. Optionally an exterior surface of the container is sized to be held in the hands of a user having an exterior surface with a second absorbent layer that can act as a napkin absorbing grease and oil from the hands of the user.

DETAILED DESCRIPTION

Figure 1A:
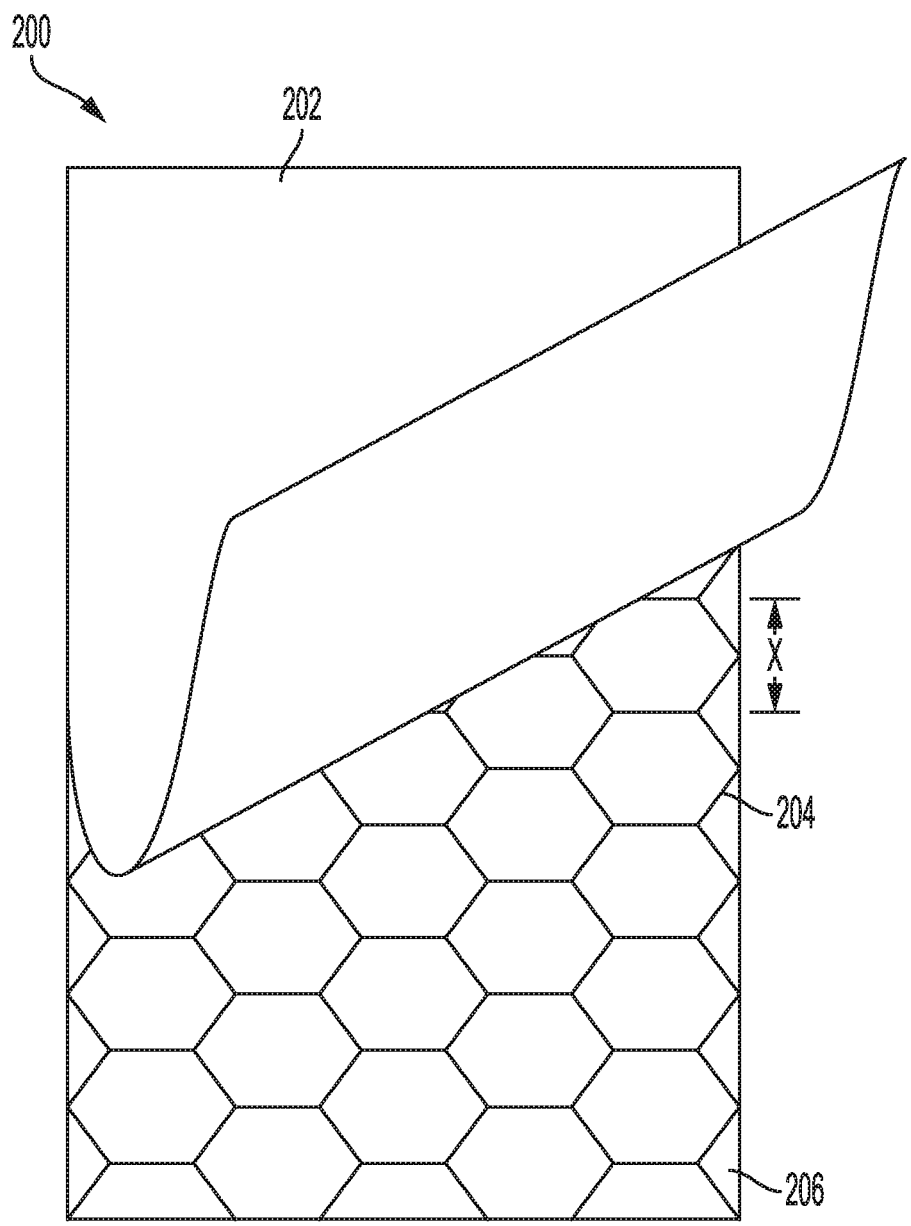
FIG. 1A is a schematic showing a first cellular adhesive pattern between the absorbent and nonabsorbent layers.

The following applications are incorporated by reference in their entirety: U.S. patent application Ser. No. 15/611,738 filed Jun. 1, 2017, U.S. patent application Ser. No. 15/611,760 filed Jun. 1, 2017, U.S. patent application Ser. No. 15/648,286 filed on Jul. 12, 2017, and U.S. patent application Ser. No. 15/648,322 filed Jul. 12, 2017.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word about in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for given purpose in connection with the invention implies the mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

With respect to the terms "comprising," "consisting of," and "consisting essentially of," where one of these three terms is used herein, the presently disclosed and claimed subject matter can include the use of either of the other two terms.

Figure 1B:
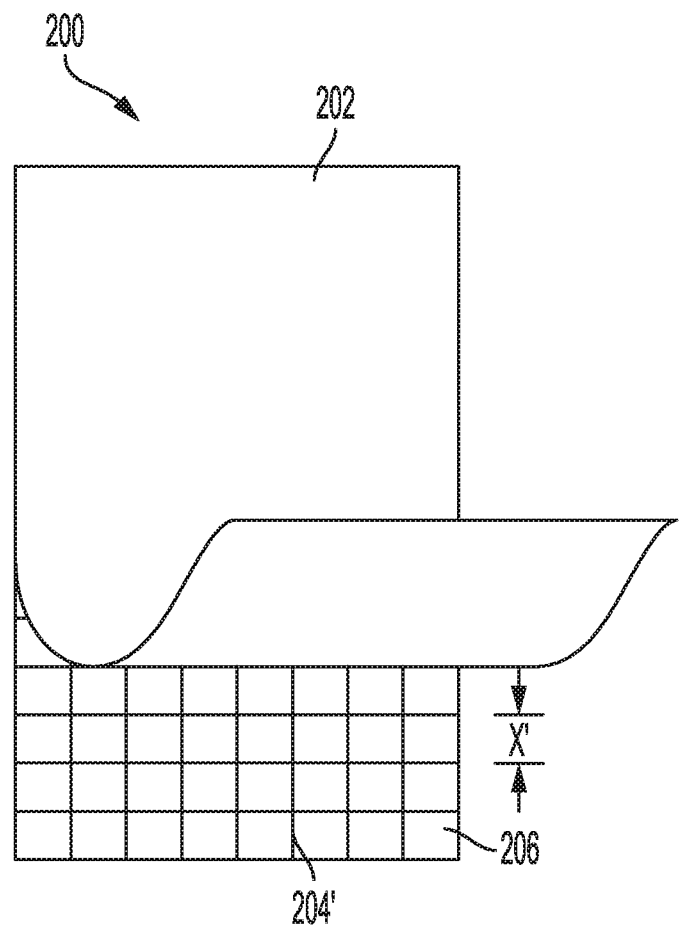
FIG. 1B is a schematic showing a second cellular adhesive pattern between the absorbent and nonabsorbent layers.

FIGS. 1A and 1B depict an absorbent paper laminate 200 including an absorbent layer 202, a nonabsorbent layer 206, and an adhesive layer 204, 204' therebetween.

The absorbent layer 202 may be made of a cellulosic fiber such as paper. In one or more embodiments, the absorbent layer 202 may have a basis weight of less than 100 pounds per 3,000 square feet. In one or more embodiments, the absorbent layer 202 may have a basis weight of less than or equal to 50 pounds per 3,000 square feet. In one or more embodiments, the absorbent layer 202 may have a basis weight of less than or equal to 30 pounds per 3,000 square feet.

In one or more embodiments, the absorbent layer 202 may have a basis weight of about 5 to 200 pounds per 3,000 square feet. In some embodiments, the absorbent layer 202 may have a basis weight of about 20 to 70. In still other embodiments, the absorbent layer 202 may have a basis weight of about 30 to 50 pounds per 3,000 square feet. For example, the basis weight may be 30 pounds per 3,000 square feet. In another example, the basis weight may be 50 pounds per 3,000 square feet.

In at least one embodiment, the basis weight may vary by about ±10 pounds per 3,000 square feet. In another embodiment, the basis weight may vary by about ±5 pounds per 3,000 square feet. In yet another embodiment, the basis weight may vary by about ±1 pounds per 3,000 square feet. The basis weight may be determined by the method described in ISO 536.

In an embodiment, the absorbent layer 202 may have a caliper of about 0.1 to 20 mils. In another embodiments, the absorbent layer 202 may have a thickness of about 1 to 10 mils. For example, the caliper may be 8.3 mils. More preferably the absorbent layer 202 may have a caliper of about 3 to 5 mils. In some embodiments, the caliper may be determined by the method described in TAPPI T411.

In one or more embodiments, porosity may be determined by the method described in TAPPI T460, TAPPI T547 om-97, ISO 5636-3, and/or the Gurley Method. In one embodiment, the porosity of the absorbent layer 202 may be less than about 200 seconds per 100 mL. In another embodiment, the absorbent layer 202 may be less than about 100 seconds per 100 mL. In still other embodiments, the porosity may be less than about 50 seconds per 100 mL. The porosity may be less than 25 seconds per 100 mL. The porosity may be less than 10 seconds per 100 mL. The porosity may be about 1 to 10 seconds per 100 mL. In at least one embodiment, the porosity may be about 2 to 8 seconds per 100 mL. In still other embodiments, the porosity may be about 4 to 6 seconds per 100 mL.

In one or more embodiments, the paper may have a porosity of about 200 to 300 Sheffield. In other embodiments, the paper may have a porosity of about 215 to 250 Sheffield. In still other embodiments, the paper may have a porosity of about 220 to 245 Sheffield.

In some embodiments, the absorbent layer 202 may have no loose fibers or components that may adhere to a food product. In one or more embodiments, the absorbent layer 202 may have a self-ignition temperature greater than 400° F. for at least 30 minutes. In one embodiment, the absorbent layer 202 may include additives to improve the heat resistance. For example, the silicon-based additives may be used to increase the heat resistance. In one or more embodiments the absorbent layer 202 may have a self-ignition temperature greater 450° F. for at least 30 minutes. In one or more embodiments the absorbent layer 202 may be safe and non-toxic for use with food.

In one or more embodiments, the absorbent layer 202 may be free of fluorinated compounds or may be free of fluorine. The absorbent layer 202 may be PFAS free. As used herein, PFAS free means not containing perflourinated chemicals (PFCs), perfluoroalkyl substances and/or polyfluoroalkyl substances (PFASs). In some embodiments, PFAS free refers to less than 100 ppm of detectable PFAS chemistry. For example, crepe paper from Ahlstrom Munksjo, headquartered in Finland may be used.

As used herein, the terms absorbent and nonabsorbent are relative to each other. For example, fats, oils, and/or grease may permeate through an absorbent material in several seconds or minutes whereas the same fats, oils and/or grease may permeate through a nonabsorbent material in several hours or longer.

A first embodiment shown in FIG. 1A has a nonabsorbent layer 206 may be made of a cellulosic fiber such as paper. In one or more embodiments, the cellulosic fiber may be coated with a resin. In an embodiment, the cellulosic fibers may be coated in a natural resin. The natural resin may provide resistance to fats, oils, and grease. In some embodiments, the nonabsorbent layer may be certified by the Biodegradable Products Institute (BPI) as a compostable product. In other embodiments, the nonabsorbent layer 206 may be oil and grease resistant (OGR). In one or more embodiments, the nonabsorbent layer 206 may be a high-density paper. In an embodiment, the nonabsorbent layer 206 may be calendared to attain a higher density. In another embodiment, the nonabsorbent layer 206 may be refined to attain a higher density. Refining refers to grinding or processing the fiber particles to produce smaller (i.e. refined) particles. One example of a refined paper is parchment.

The nonabsorbent layer 206 may have a basis weight of greater than 5 pounds per 3,000 square feet. In another embodiment, the nonabsorbent layer 206 may have a basis weight of greater than or equal to 15 pounds per 3,000 square feet. In one or more embodiments, the nonabsorbent layer 206 may have a basis weight of greater than or equal to 18 pounds per 3,000 square feet. Alternatively, the basis weight may be greater than or equal to 20 pounds per 3,000 square feet.

In one or more embodiments, the nonabsorbent layer 206 may have a basis weight of about 5 to 250 pounds per 3,000 square feet. More preferably, the nonabsorbent layer 206 may have a basis weight of about 10 to 100 pounds per square feet. In other embodiments, the basis weight may be about 15 to 60 pounds per 3,000 square feet. In another embodiment, the basis weight may be about 15 to 30 pounds per 3,000. For example, the basis weight may be about 18 pounds per 3,000 square feet. The heavy nonabsorbent layer material is used when fabricating carton stock. The light nonabsorbent layer material is used when fabricating liner papers.

The basis weight may vary by about ±10 pounds per 3,000 square feet. In one or more embodiments, the basis weight may vary by about ±5 pounds per 3,000 square feet. In one or more embodiments, the basis weight may vary by about ±1 pounds per 3,000 square feet. Heavier papers will tend to vary more than lighter weight papers.

In one or more embodiments, the nonabsorbent layer 206 may have a caliper of about 0.1 to 20 mils. In one or more embodiments, the nonabsorbent layer 206 may have a caliper of about 1 to 10 mils. In one or more embodiments, the nonabsorbent layer 206 may have a caliper of about 1 to 3 mils. In one or more embodiments, the nonabsorbent layer 206 may have a caliper of less than about 5 mils. In one or more embodiments, the nonabsorbent layer 206 may have a caliper of less than about 3 mils. In one or more embodiments, the nonabsorbent layer 206 may have a caliper of less than about 2 mils. For example, the caliper may be about 1.8 mils.

In one or more embodiments, the nonabsorbent layer 206 may have a porosity of greater than or equal to 30 seconds per 100 mL by the TAPPI T460 method at 1.22 kPa and 1 sq. in. In one or more embodiments, the porosity may be greater than or equal to 40 seconds per 100 mL. In one or more embodiments, the porosity may be greater than or equal to 100 seconds per 100 mL. In one or more embodiments, the porosity may be greater than or equal to 100 seconds per 100 mL. In yet another embodiment, the porosity may be greater than or equal to 500 seconds per 100 mL.

In one embodiment, the nonabsorbent layer 206 may have no loose fibers or loose components that may adhere a food product. In one or more embodiments, the nonabsorbent layer 206 may have a self-ignition temperature greater than 400° F. for at least 30 minutes. In one or more embodiments, the nonabsorbent layer 206 may have a self-ignition temperature greater than 450° F. for at least 30 minutes. In one or more embodiments the nonabsorbent layer 206 may be safe and non-toxic for use with food. In one or more embodiments, the nonabsorbent layer 206 may be free of fluorinated compounds or may be free of fluorine. In one or more embodiments, the nonabsorbent layer may be PFAS free. For example, the nonabsorbent layer may be Grease-Gard® with FluoroFree® technology from Ahlstrom Munksjo, headquartered in Finland.

The adhesive adheres the absorbent and nonabsorbent layers 202, 206 together forming an adhesive layer 204, 204'. The adhesive may be any adhesive known to those skilled in the art. In one or more embodiments, the adhesive may be natural based. In one or more embodiments, the adhesive may be selected from metallocene, hide glue, protein glue, animal glue, various water-based glues including dextrin or starch, or various other natural resins or any combination thereof. In one or more embodiments, a casein-based adhesive may be used.

Alternatively, in one or more embodiments, the adhesive may be based on a synthetic polymer. In one or more embodiments, a styrene butadiene rubber (SBR) may be used. In one or more embodiments, the adhesive may be compliant with 21 C.F.R. § 177.1520. In one or more embodiments, a polyethylene resin may be used. In one or more embodiments, a homopolyethylene resin may be used as an adhesive. For example, an adhesive from ProAmpac, located in Wrightstown, Wis. may be used. In one or more embodiments, an acrylic may be used. In one or more embodiments, the adhesive may be odorless. For example, an acrylic adhesive from West Carrollton Parchment & Converting Inc. located in West Carrollton, Ohio. In one or more embodiments, the adhesive is safe for contact with food products. In one or more embodiments, the adhesive may be compliant with 21 C.F.R. §§ 174-177. In one or more embodiments, the adhesive may be defined as a food-contact substance and comply with U.S. 21 C.F.R. § 175.105 and/or § 175.300.

In one or more embodiments the adhesive may be applied in a cellular pattern. The pattern may include various shapes, orientations, and dimensions. For example, in FIG. 1A the adhesive forms a pattern including a plurality of interconnected hexagons with a dimension X across the flats. In one or more embodiments, X may be about 0.125 to 1.0 inch. In one or more embodiments, X may be about 0.25 to 0.75 inch. In still other embodiments, X may be about 0.375 to 0.5 inch.

Alternatively, as FIG. 1B, the adhesive may form a pattern of interconnected rectangles. In one or more embodiments, the rectangles may be square with a dimension X'. In other embodiments, X' may be about 0.25 to 1 inch. In still other embodiments, X' may be about 0.375 to 0.5 inch. It should be understood that the rectangular pattern is not limited to a square. For example, a pattern may be comprised of rectangles having a length of about 0.25 to 1 inch and a width of about 0.25 to 1 inch each. In another example, the rectangles may have a length of about 0.375 to 0.875 inch and a width of about 0.375 to 0.875 inch. In yet another embodiment, the rectangles may have a length of about 0.875 inch and a width of about 0.375 inch.

In one or more embodiments, the cellular pattern may include a cell with a shape having an area of about 0.05 to 0.5 square inch. In other embodiments, the area may be about 0.6 to 0.4 square inch. In still other embodiments, the area may be about 0.12 to 0.25 square inch. For example, a cellular pattern may define one or more hexagons having an area of about 0.14 square inch each. In another example, a cellular patter may define one or more polygons having an area of about 0.38 square inch each.

The void or empty space created by the cellular patterns may assist in insulating hot food and/or assist in absorbing fats, oils, and/or grease. In one or more embodiments, a large cell pattern may be used to reduce cost. In one or more embodiments, the adhesive layer 204, 204' may not be in a cellular pattern. For example, the adhesive layer 204, 204' may be applied as a solid coating. In one or more embodiments, the adhesive layer 204, 204' may be applied as unconnected portions, such a plurality of separate droplets or lines. In some embodiments, the adhesive may be visible through the absorbent and/or nonabsorbent layer 202, 206 and form a design. For example, the adhesive may identify text or an image in the center of the absorbent paper laminate 200 with a cellular pattern surrounding the central text or image.

In one or more embodiments, the adhesive layer 204, 204' may be extruded onto the absorbent layer 202 or the nonabsorbent layer 206. In other embodiments, the adhesive layer 204, 204' may be stamped onto the absorbent layer 202 or the nonabsorbent layer 206. In still other embodiments, the adhesive layer 204, 204' may be applied by a gravure roller. After the gravure application the absorbent layer 202 and the nonabsorbent layer 206 with the adhesive therebetween may pass through a nip, 3-roll stack arranged in an S-pattern, to press the layers into absorbent paper laminate 200 including an absorbent layer 202, a nonabsorbent layer 206, and an adhesive layer 204, 204' therebetween. In one or more embodiments, the adhesive may be applied to the absorbent layer 202 or the nonabsorbent layer 206. Then the absorbent layer 202 or the nonabsorbent layer 206 may be applied to the adhesive and passed through a nip. In some embodiments, the application rate may have a dry weight of 0.5 to 10 pounds per 3,000 square feet of adhesive. In other embodiments, the application rate may be 1 to 4 pounds per 3,000 square feet. The absorbent layer 202, nonabsorbent layer 206 and adhesive layer 204 may be combined by any process to form laminate.

In one or more embodiments, the adhesive layer may include an adhesive. In some embodiments, the adhesive may have a melting temperature above 325° F. In other embodiments, the adhesive may have a melting temperature above 400° F. In still other embodiments, the adhesive may have a melting point above 450° F. In one or more embodiments, the adhesive may be free of fluorinated compounds or may be free of fluorine. In one embodiment, the adhesive may be PFAS free. In some embodiments, the adhesive may meet the ASTM 6400 biodegradability standard.

In one or more embodiments, the absorbent paper laminate 200 may have a self-ignition temperature greater than 400° F. for at least 30 minutes. In other embodiments, the absorbent paper laminate 200 may have a self-ignition temperature of greater than 450° F. for at least 30 minutes. In some embodiments, the absorbent paper laminate 200 may be PFAS free. In one or more embodiments, the absorbent paper laminate 200 may be biodegradable or certified biodegradable. In one or more embodiments, a certifying entity may include BPI, Organic Waste Systems (OWS), Cedar Grove Composting, Inc., or any combination thereof. In some embodiments, the absorbent paper laminate 200 may meet the ASTM 6868-11 biodegradability standard. In other embodiments, the absorbent paper laminate 200 may meet the ASTM 6400 biodegradability standard. In one or more embodiments, the absorbent paper laminate 200 may be compostable. In one embodiment, the absorbent paper laminate 200 may be flexible or malleable. For example, a user may crush the used absorbent paper laminate 200 such that the nonabsorbent layer 206 forms an exterior surface and the absorbent layer 202 forms an interior surface. In some embodiments, this may allow a user to dispose of a used absorbent paper laminate 200 without exposing a user's hands or body to the absorbed materials.

In other words, a user may crumple up and discard a used absorbent paper laminate 200. In one or more embodiments, the absorbent paper laminate 200 may be FDA compliant. For example, the absorbent paper laminate 200 may adhere to and be compliant with 21 CFR §§ 170, 174-178, 180, 181, and/or 186.1. In at least one embodiment, the absorbent paper laminate 200 may be allergen free. In some embodiments, allergen free may indicate no intentional amount of milk, eggs, fish, crustacean, shellfish, tree nuts, peanuts, wheat, soybeans, sesame seeds, rubber and/or latex is used. In some embodiments, the absorbent paper laminate 200 may be free of heavy metals. For example, no lead, mercury, cadmium, arsenic, and/or hexavalent chromium is intentionally added. In at least one embodiment, lead, mercury, cadmium, arsenic, and/or hexavalent chromium may have a concentration of less than 100 parts per million by weight. In some embodiments, the absorbent paper laminate 200 may be phthalate free or no phthalates may be intentionally added. In one or more embodiments, the absorbent paper laminate 200 may comply with EU Directive 2015/863.

Figure 2:
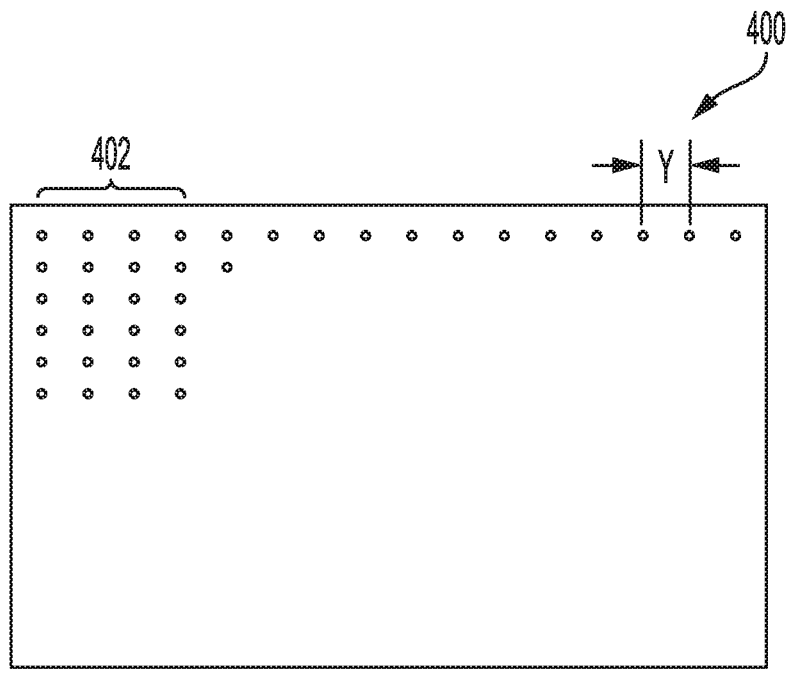
FIG. 2 is a plan view showing an absorbent paper laminate with an array of perforations formed by needles.
Figure 4:
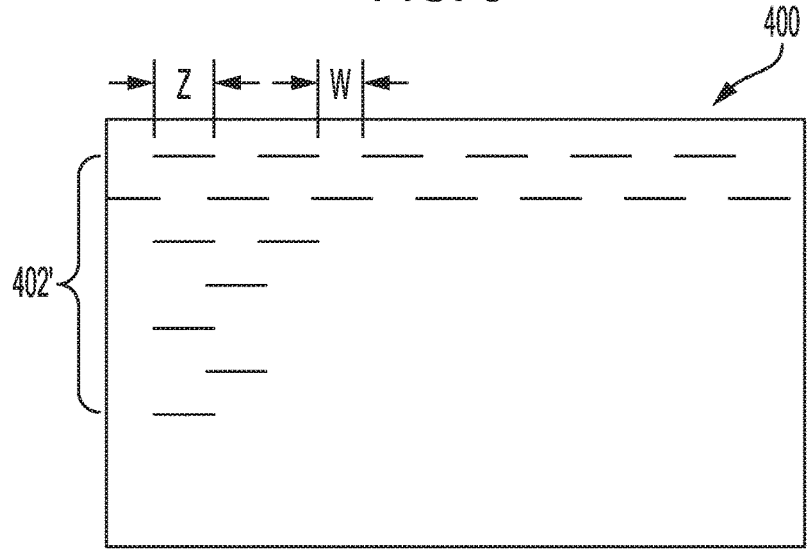
FIG. 4 is a plan view showing an alternative absorbent paper laminate with an array of perforations formed by series of cut segments.

FIGS. 2 and 4 show an absorbent paper laminate 400 including an array of perforations 402, 402'. The term array as used herein describes a plurality of perforations within an area that do not merely form a line. In one or more embodiments, the array of perforations 402, 402' may release water while substantially retaining fats, oils, and/or grease. The array of perforations 402, 402' may be advantageous for cooking or re-heating. Without being bound by theory it is believed that the array of perforations allow gases and/or vapors such as steam to pass through the perforations while retaining solids and/or liquids such as fats, oils, and/or grease. In one or more embodiments, the array of perforations 402, 402' may be advantageous for re-crisping a food item. The absorbent paper laminate 400 may have a plurality of perforations in any configurations. In at least one embodiment, food may obtain or maintain a crispy texture as opposed to developing a soggy texture. In another embodiment, the perforations may release gases and/or vapors such as steam while substantially retaining bulk liquids and/or solids such as fats, oils, and/or grease.

The array of perforations 402, 402' may be on the entire absorbent paper laminate 400 or a portion of the absorbent paper laminate 400. In still other embodiments, the array of perforations 402, 402' may be on one or more portions of the absorbent paper laminate 400.

The array of perforations 402, 402' may be in any configuration. For example, the array of perforations 402 may include perforations aligned along an x and y-axis as in FIG. 2. Alternatively, the array of perforations 402' may include perforations in an offset pattern. For example, the perforations may be aligned along an x-axis and offset along a y-axis as in FIG. 4.

The perforations in the array of perforations 402, 402' may be substantially uniform. The perforations may also be spaced apart at various distances. For example, in FIG. 2, the center of each perforation is a distance y from the center of another adjacent perforation. In one or more embodiments, the distance y may be about 0.125 to 1 inch. In one or more embodiments, y may be about 0.25 to 0.75 inch. In other embodiments, y may be about 0.375 to 0.675 inch.

In one or more embodiments, there may be less than 1 perforation per square inch. In other embodiments, there may be at least 4 perforation per square inch. In still other embodiments, there may be at least 20 perforations per square inch. In at least one embodiment, there may be at least 40 perforations per square inch. In another embodiment, there may be at least 100 perforations per square inch.

The perforations may be various shapes and sizes. For example, the perforations may be a shape and/or size that allows gases and vapors to travel through them, while substantially retaining fats, oils, and/or grease. In one embodiment, the perforations may be substantially round as in FIG. 2. In another embodiment, the perforations may be oval-shaped. In still other embodiments, the perforation may have a cross-shape. In FIG. 4, the perforations may have an elongated slit-shape with a length of z. In FIG. 4, the elongated slit-shaped perforations are spaced a distance of w. In one or more embodiments, z may be about 0.0625 to 0.75 inch. In some embodiments, w may be about 0.625 to 1 inch. In other embodiments, z may be about 0.125 to 0.5 inch. In at least one embodiment, w may be about 0.125 to 0.75 inch. In still other embodiments, z may be about 0.25 to 0.5 inch. In another embodiment, w may be about 0.25 to 0.625 inch.

Figure 3:
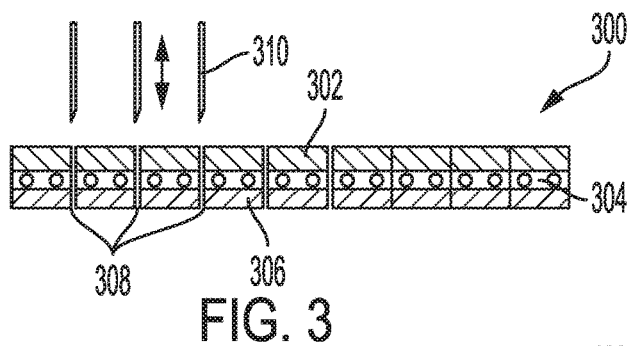
FIG. 3 is an enlarged cross-sectional view of an absorbent paper laminate with perforations formed by needles.

FIG. 3 illustrates perforations 308 that may form a portion of the array of perforations 402. The perforations 308 may be formed by penetration of a needle 310 through the absorbent paper laminate 300. The perforations 308 may be formed by a needle 310 having a diameter of about 1 to 75 mils. For example, the perforations 308 may be formed by a needle 310 having a diameter of about 5 to 50 mils. In one embodiment, the perforations 308 may be formed by a needle 310 having a diameter of 20 to 40 mm. In another embodiment, the absorbent layer 302 may be pierced by the needle 310 first, followed by the adhesive layer 304, and finally the nonabsorbent layer 306. In still other embodiments, the nonabsorbent layer 306 may be pierced by the needle 310 first, followed by the adhesive layer 304, and the absorbent layer 302. The perforations may be formed by a plurality of needles. In an embodiment, cutting the perforations 308 does not produce loose material or fragments that may adhere to a food item. For example, piercing the absorbent layer 302 to the nonabsorbent layer 306 may ensure that loose materials or fragments do not adhere to a food item. Further, without being bound by theory, piercing from the absorbent layer 302 to the nonabsorbent layer 306 may assist in removing or wicking away water from a food item.

In some embodiments, the perforations 308 are generally uniformly formed in the laminate surface. Uniform perforations may indicate that the diameter of each perforation is ±10% of the average diameter. It should be understood that the needle 310 may have various shapes and sizes. For example, the needle 310 may have a tapered point. In one or more embodiments, the needle 310 may increase in diameter from a point and the size of a perforation may be altered by changing the depth or degree of penetration through the absorbent paper laminate 300.

Figure 5:
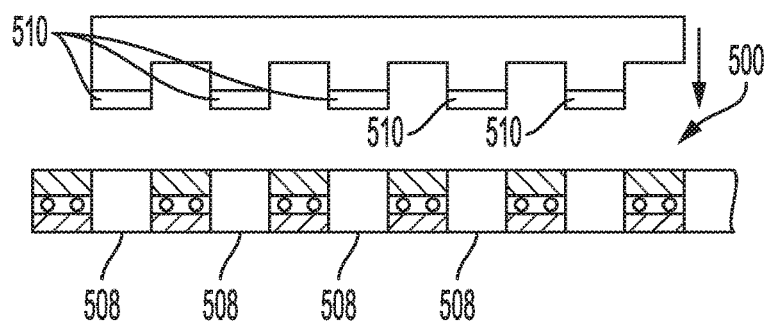
FIG. 5 is an enlarged cross-sectional view of an absorbent paper laminate with perforation formed by a series of cut segments.

In FIG. 5, the perforations 508 which may form the array of perforations 402' may be formed by penetration of a cut segment or a series of cut segments 510. In one embodiment, the cut segments may have a length of less than about 0.25 inch. In another embodiments, the cut segments may have a length of less than about 0.125 inch. In yet another embodiment, the cut segments may have a length of less than about 0.0625 inch. In still other embodiments, the cut segment may have length of about 20 to 250 mils. In at least one embodiment, the cut segment may have a length of about 35 to 125 mils. In still other embodiments, the cut segment may be about 40 to 65 mils. It should be understood that a portion of larger cut segments may also be used to form the perforations 508.

Figure 6A:
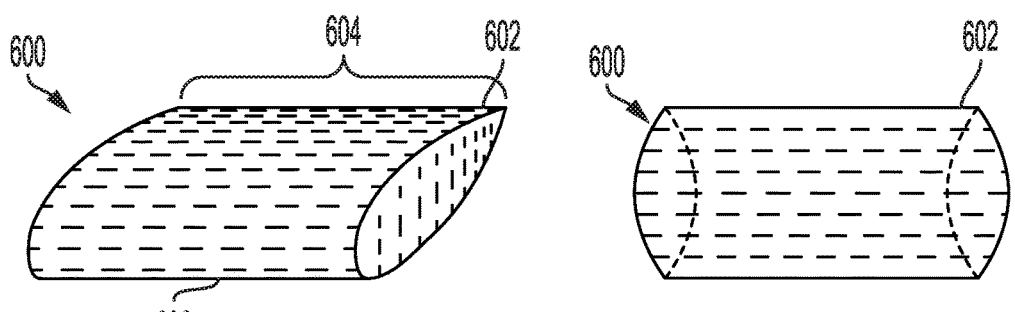
FIG. 6A is a perspective view of an erected first exemplary food package made from a perforated absorbent paper laminate.
Figure 6B:
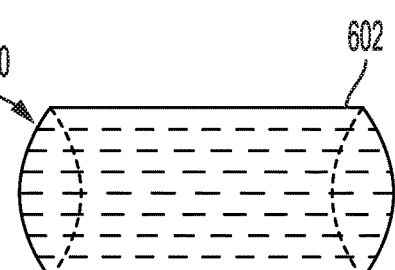
FIG. 6B is a top view of the first exemplary food package of FIG. 6A in a flattened un-erected state.

In one or more embodiments, the absorbent paper laminate 200 may be of various shapes and sizes. In some embodiments, the absorbent paper laminate 200 may be used to form packaging or may be used with packaging. In other embodiments, one or more absorbent paper laminates may be used as packaging or with packaging. FIGS. 6A and 6B illustrate a paper board food container 600 including a paper laminate body 602 defining a cavity for receiving a food item. In one or more embodiments, an absorbent paper laminate may form a paper laminate body 602. In an embodiment, the cavity may be fully or partially enclosed. In one or more embodiments, the paper board food container 600 is sized to be held in the hands of a user.

In another embodiment, the absorbent paper laminate forming the paper laminate body 602 may include an array of perforations 604 on a surface 606. The array of perforations 604 may release water while retaining fats, oils, and/or grease. In yet another embodiment, the perforations 604 may release gases or vapors such as steam while retaining liquids or solids such as fats, oils and/or grease.

The absorbent paper laminate 200 may be used to clean or remove unwanted fats, oils, grease and/or other materials from a surface. For example, the absorbent layer 202 of an absorbent paper laminate 200 may be used wipe away remove fats, oils, and/or grease from a cooking pan or countertop.

An absorbent paper laminate 200 may also be used as a removeable cooking liner. For example, an absorbent paper laminate 200 may be used to cook a food item such as bacon. The absorbent paper laminate 200 used to cook a food item may be removed and disposed of reducing the need for cleaning. In an embodiment, the absorbent paper laminate 200 forming a cooking liner may have a lip or score that may inhibit fats, oils and/or grease from flowing off of the absorbent paper laminate 200.

In some embodiments, an absorbent paper laminate 200 may have characteristic certified by a government agency or environmental body. For example, the FDA may certify that an absorbent paper laminate 200 used as packaging or with packaging absorbs an estimated amount of nutrients such as fat or sodium. In one or more embodiments, the estimated amount of absorbed nutrients may be based on the average expected time in the food packaging. In at least one embodiment, the packaging may provide the estimated reduced amount of nutrients. For example, the FDA may certify that a pizza has an estimated reduced fat and sodium content because of the use of an absorbent paper laminate 200 based on the average time required for delivery a pizza. Another example may include FDA certification for an estimated reduction in fat and sodium for a bag of chips including an absorbent paper laminate based on the average shelf life of a bag of chips.

Figure 7:
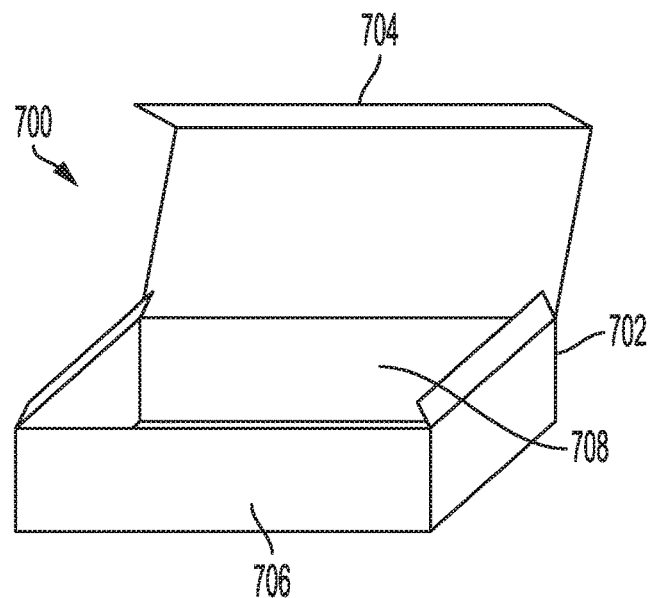
FIG. 7 is a perspective view of a second exemplary food package made from an absorbent paper laminate.

FIG. 7 illustrates an absorbent paper laminate formed into a paper board food container 700 including a paper laminate body 702 defining a cavity. The paper laminate body 702 may be of any shape and size. In one embodiment, the paper laminate body 702 may form a cavity of any shape or size. For example, in FIG. 7 the paper laminate body 702 defines a rectangular shaped cavity with a lid 704 that opens and closes. In another embodiment, the absorbent paper laminate may be prepared to accommodate or replace any paper board or corrugated board packaging known to those skilled in the art. For example, the absorbent paper laminate may be scoured or perforated for easy assembly of the paper laminate body 702.

In one or more embodiments, the paper laminate body 702 may be assembled with the nonabsorbent layer forming an exterior surface 706 and the absorbent layer forming an interior surface 708 of the paper laminate body 702. Generally, the interior surface 708 will be in communication with the cavity. The cavity may be used to hold a food item. The interior surface 708 formed by the absorbent layer may absorb fats, oils, grease and/or sodium from a food item. Alternatively, the paper laminate body 702 may be assembled with the absorbent layer forming the exterior surface 706 and the nonabsorbent layer forming the interior surface 708 of the paper laminate body 702. The exterior surface 706 formed from the absorbent layer may function like a napkin. In some embodiments, the paper board food container 700 is sized to be held in the hands of a user. In one or more embodiments, the exterior surface 706 formed by the absorbent layer may allow a user to remove fats, oils, grease and/or other materials from the user's hands or body.

Figure 8:
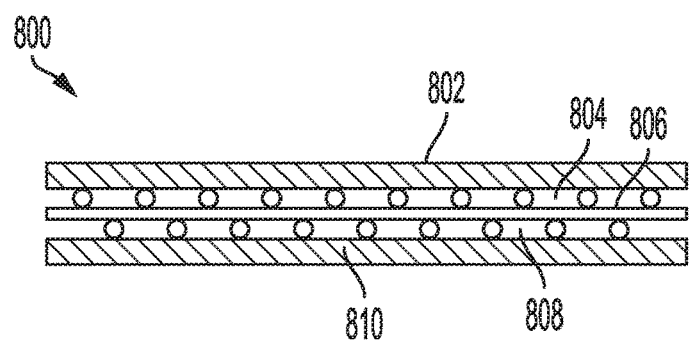
FIG. 8 is a cross-sectional view showing an absorbent paper laminate having a first absorbent layer, a first adhesive layer, a nonabsorbent layer, a second adhesive layer, and a second absorbent layer.
Figure 9:
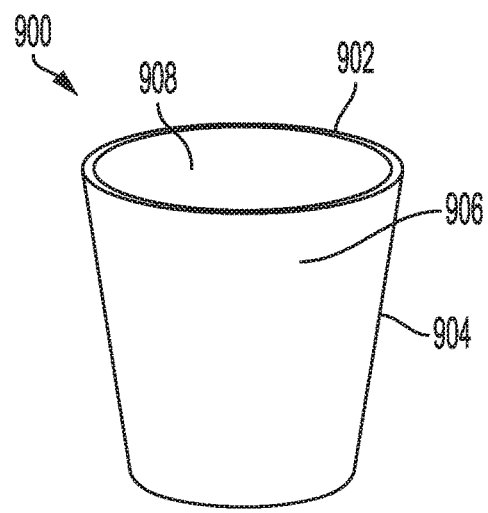
FIG. 9 is a perspective view of a third exemplary food package made from an absorbent paper laminate.

FIG. 8 illustrates an absorbent paper laminate 800 having a first absorbent layer 802, a first adhesive layer 804, a nonabsorbent layer 806, a second adhesive layer 808, and a second absorbent layer 810. In at least one embodiment, the absorbent paper laminate may have a first absorbent layer, an adhesive layer and a second absorbent layer. The absorbent paper laminate 800 may be any shape and size. For example, in FIG. 9 a paper board food container 900 is formed from an absorbent paper laminate. The paper board food container 900 includes a paper laminate body 902 defining an at least partially enclosed cavity. The cavity is capable of receiving a food item and includes one or more walls 904. The paper laminate body 902 has an exterior surface 906 and an interior surface 908. In an embodiment, the exterior surface 906 and interior surface 908 may be formed from a first absorbent layer and a second absorbent layer. The interior surface 908 may be formed by the first absorbent layer and may be capable of absorbing fats, oils, grease and/or sodium from a food item placed within the cavity. The exterior surface 906 formed by the second absorbent layer may be capable of absorbing fats, oils, grease and/or other materials from a user's body or external surface. In one or more embodiments, the one or more walls 904 of the enclosed cavity can absorb fats, oils, and/or grease. The paper board food container 900 may optionally include an array of perforations.

Figure 10:
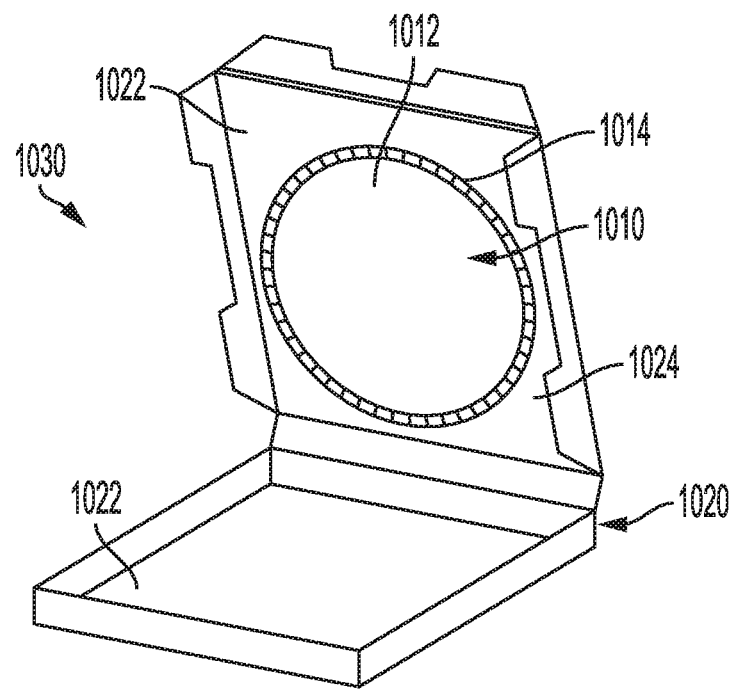
FIG. 10 is a perspective view of a fourth exemplary food package including an absorbent paper laminate liner.

FIG. 10 demonstrates a paper board food container 1030 including a food container body 1020 and an absorbent paper laminate liner 1010 in and/or on the food container body 1020. The absorbent paper laminate liner 1010 includes an absorbent paper laminate. In one or more embodiments the absorbent paper laminate liner 1010 includes an absorbent layer 1012, an adhesive layer and a nonabsorbent layer 1014. The food container body 1020 may define an at least partially enclosed cavity with an interior surface 1022. In at least one embodiment, the food container body 1020 may include a lid 1024. The food container body 1020 may be in any shape and size. For example, the food container body 1020 may be in a shape and size suitable for a pizza.

The absorbent paper laminate liner 1010 may be in any shape and size. In one example, the absorbent paper laminate liner 1010 may substantially cover the interior surface 1022. In another embodiment, the absorbent paper laminate liner 1010 may cover only a portion of the interior surface 1022. Covering only a portion of the interior surface 1022 may reduce cost, make manufacturing more efficient, and/or make absorbent paper laminate liner products more universal. Covering only a portion of the interior surface may allow for easy removeable by a user prior to recycling the food container body 1020. It should be understood that the absorbent paper laminate liner is not limited to use on the interior surface and may likewise be used on an exterior surface. The food container body 1020 and absorbent paper laminate liner 1010 may be sold by separate suppliers and/or manufactured by separate manufacturers. For example, in FIG. 10 the absorbent paper laminate liner 1010 covers only a portion of the interior surface 1022 of the lid 1024. In some embodiments, the absorbent paper laminate liner 1010 may protect the lid 1024 of the food container body 1020 and/or absorb fats, oils, grease and/or sodium from a food item. For example, the food container body 1020 may form a pizza box in which the absorbent paper laminate liner 1010 protects the lid 1024 and/or is capable of removing fats, oils, grease and/or sodium from the top of a pizza. The absorbent paper laminate liner 1010 may be of a shape and size designed to fit in the at least partially enclosed cavity of a food container body 1020. In other embodiments, the shape and size of the absorbent paper laminate liner 1010 may not be designed to fit any particular food container body 1020.

In an embodiment, a plurality of absorbent paper laminate liners may be used. In one or more embodiments, a first absorbent paper laminate liner may be disposed on the lid 1024 and second absorbent paper laminate liner may be disposed on the interior surface 1022 of the bottom of the food container body 1020. For example, a first absorbent paper laminate liner may be disposed on the lid of a pizza box and a second absorbent paper laminate liner may be disposed on the bottom of a pizza box. The first and second absorbent paper laminate liners may protect the body from contamination and/or may be capable of removing fats, oils, grease and/or sodium from a pizza. In an embodiment, the absorbent paper laminate liner 1010 may be adhered to the body 1020. In another embodiment, the absorbent paper laminate may not be adhered to the body 1020.

Figure 11:
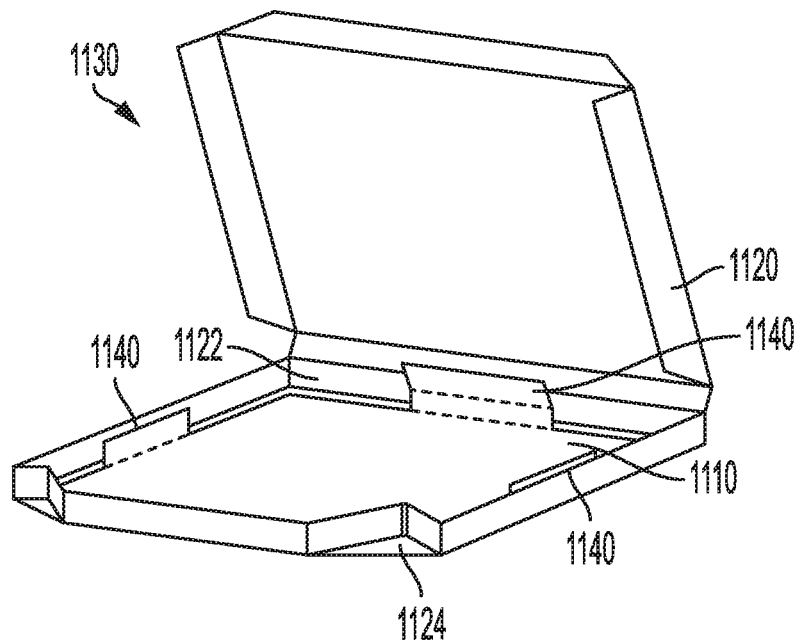
FIG. 11 is a perspective view of a fifth exemplary food package including an absorbent paper laminate liner.

FIG. 11 demonstrates a paper board food container 1130 including a food container body 1120 an absorbent paper laminate liner 1110. In FIG. 11, the shape and size of the paper laminate liner 1110 is designed to substantially cover a portion of the interior surface 1122. In at least one embodiment, the absorbent paper laminate liner 1110 is designed to substantially cover the bottom 1124 of the food container body 1120. The paper board food container 1130 may be a pizza box. In some embodiments, the absorbent paper laminate liner 1110 may allow for easy removeable by a user prior to recycling the food container body 1120 or the absorbent paper laminate liner 1110. In one or more embodiments, the paper laminate liner 1110 may have portions designed to assist inserting or removing the paper laminate liner 1110 into or from the food container body 1120. For example, the paper laminate liner 1110 may have one or more tabs 1140. In one or more embodiments, the absorbent paper laminate liner 1110 may be sold separate from the food container body 1120.

It should be understood that in one or more embodiments a food item is not required. For example, an absorbent paper laminate liner may protect or may be capable of protecting a paper board container from fats, oils, and/or grease. Likewise, an absorbent paper laminate liner may remove or may be capable of removing fats, oils, and/or grease from a food item, a user's body or another surface.

While describing various embodiments, absorbing fats, oils and/or grease is frequently used to describe adsorption and absorption. Further, it should be understood that reference to an absorbent layer for absorbing fats, oils and/or grease does not indicate that the absorbent layer is not capable of absorbing other food ingredients. For example, the absorbent layer may also absorb sodium, cholesterol and/or other food ingredient that may be associated with health risk. It should further be understood that the absorbent paper laminates described herein, are not limited to use with food (e.g. food packaging or food preparation). Food is used in an exemplary manner to describe and provide context. The absorbent paper laminates described herein may be useful for many other applications. For example, the absorbent paper laminates described herein may be useful for various applications in a garage. In one or more embodiments, the absorbent paper laminates described herein may be placed under a motorcycle, for example, to catch fluids such as oil and grease. Likewise, the absorbent paper laminate may be suitable for any purpose that requires absorbing liquids.

While exemplary embodiments are described above, it is not intended that these embodiments describe all possible forms encompassed by the claims. The words used in the specification are words of description rather than limitation, and it is understood that various changes can be made without departing from the scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An absorbent paper laminate, comprising:
    an absorbent paper layer having a caliper of 0.1 to 20 mils, a basis weight of less than 100 pounds per 3,000 square feet, and a porosity of less than 25 seconds per 100 mL by the TAPPI T460 method at 1.22 kPa and 1 sq. in.;
    a nonabsorbent dense paper layer having a caliper of 0.1 to 20 mils, a basis weight of greater than 5 pounds per 3,000 square feet, and a porosity of greater than or equal to 30 seconds per 100 mL by the TAPPI T460 method at 1.22 kPa and 1 sq. in.; and
    an adhesive selectively applied in a layer between the absorbent and nonabsorbent layers in a cellular pattern, wherein the three layers form a laminate
    wherein an array of perforation perforate through each layer of the laminate and the array of perforations are sized to allow steam to pass through the laminate while retaining grease and oil in the absorbent paper layer.

2. The paper laminate of claim 1, wherein at least 1 perforation per square inch is generally uniformly formed in the surface.

3. The paper laminate of claim 1, wherein the perforations are formed by needle having a diameter of 20 to 40 mils.

4. The paper laminate of claim 1, wherein the perforations are formed by series cut segments.

5. The paper laminate of claim 1, wherein the cellular pattern forms a plurality of interconnected hexagons which are 0.125 to 1.0 inch across the flats.

6. The paper laminate of claim 1, wherein the cellular pattern forms a plurality of interconnected hexagons which are 0.375 to 0.5 inch across the flats.

7. The paper laminate of claim 1, wherein the adhesive has a melting temperature above 400° F.

8. The paper laminate of claim 1, wherein the adhesive meets the ASTM 6400 biodegradability standard and the absorbent paper layer, the nonabsorbent paper layer and the adhesive are PFAS free.

9. A paper board food container formed of the paper laminate of claim 1, comprising:
    a paper laminate body defining an at least partially enclosed cavity for receiving a food item.

10. The paper board food container of claim 9, wherein the perforations are formed by needle having a diameter of 1 to 75 mils.

11. The paper board food container of claim 9, wherein the perforations are formed by series cut segments each having a length of less than 0.25 inch.

12. The paper board food container of claim 9, wherein the adhesive is selectively applied in a layer between the absorbent and nonabsorbent layers in a cellular pattern where cellular pattern forms a plurality of interconnected cells which each have an area of 0.05 to 0.5 square inch.

13. The paper board food container of claim 9, wherein the paper laminate body is configured such that the absorbent paper layer is more adjacent to the food item then the non-absorbent layer when the food item is received.

14. The absorbent paper laminate of claim 1, wherein the adhesive is selectively applied in a layer between the absorbent and nonabsorbent layers in a cellular pattern where cellular pattern forms a plurality of interconnected cells which each have an area of 0.12 to 0.25 square inch.

15. The absorbent paper laminate of claim 1 wherein the nonabsorbent paper layer is calendared or refined to attain a higher density.

16. The absorbent paper laminate of claim 1, wherein the non-absorbent dense paper layer is coated with a natural resin.

17. An absorbent paper laminate, comprising:
    an absorbent paper layer having a caliper of 0.1 to 20 mils and a basis weight of less than 100 pounds per 3,000 square feet;
    a nonabsorbent paper layer having a caliper of 0.1 to 20 mils and a basis weight of greater than 5 pounds per 3,000 square feet such that the nonabsorbent paper layer is permeable to fats, oil and/or grease but less permeable than the absorbent paper layer; and
    an adhesive selectively applied in a layer between the absorbent and nonabsorbent layers in a cellular pattern forming a laminate.

18. The absorbent paper laminate of claim 17 wherein fats, oils, and/or grease permeates through the non-absorbent layer in no less than hours.

19. The absorbent paper laminate of claim 17, wherein the non-absorbent paper layer is not coated with a resin.

* * * * *